United States Patent
Kannas et al.

(10) Patent No.: US 6,683,853 B1
(45) Date of Patent: Jan. 27, 2004

(54) DYNAMIC UPGRADE OF QUALITY OF SERVICE IN A PACKET SWITCHED NETWORK

(75) Inventors: Chris Kannas, Vårgårda (SE); Hans-Olof Sundell, Öckerö (SE); Rutger Andersson, Kista (SE); Niclas Carlsson, Göteborg (SE); Tomas Holmström, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/452,911

(22) Filed: Dec. 1, 1999

(51) Int. Cl.[7] .............. H04L 1/20; H04L 12/28; H04L 12/56
(52) U.S. Cl. .............. 370/237; 370/230; 370/395.21; 370/395.43; 370/401
(58) Field of Search ................ 370/235, 237, 370/229, 230, 395.2, 395.21, 395.43, 349, 392, 401, 389, 465, 474, 340, 345; 455/422, 464, 445, 448

(56) References Cited

U.S. PATENT DOCUMENTS

| | | | | |
|---|---|---|---|---|
| 5,729,541 A | * | 3/1998 | Hamalainen et al. | 370/337 |
| 5,966,660 A | * | 10/1999 | Jonsson | 455/445 |
| 6,031,832 A | * | 2/2000 | Turina | 370/348 |
| 6,091,709 A | * | 7/2000 | Harrison et al. | 370/235 |
| 6,324,473 B1 | * | 11/2001 | Eschenbach | 701/215 |
| 6,389,005 B1 | * | 5/2002 | Cruickshank | 370/352 |
| 6,434,133 B1 | * | 8/2002 | Hamalainen | 370/338 |
| 6,487,595 B1 | * | 11/2002 | Turunen et al. | 709/226 |
| 6,496,481 B1 | * | 12/2002 | Wu et al. | 370/242 |
| 6,529,591 B1 | * | 3/2003 | Dosani et al. | 379/106.03 |

FOREIGN PATENT DOCUMENTS

| | | |
|---|---|---|
| JP | 0932280 | 7/1999 |
| WO | WO 9711570 | 9/1997 |

OTHER PUBLICATIONS

Jeng J -Y et al: Equal Resources Sharing Scheduling for PCS Data Services: vol. 5, No. 1, Jan. 1999, pp. 41–55, XP000804144; ISSN: 1022–0038.

"QoS in GPRS phase 2 —Edge Node Qos interworking"; Tdoc SMG12 C–99–461; May $25^{th}$–$28^{th}$, 1999; pp. 1–7.

* cited by examiner

Primary Examiner—Dang Ton
Assistant Examiner—Ronald Abelson

(57) ABSTRACT

A system and method for allocating system resources to provide a selected quality of service in connection with data communications. A mobile user station requests a first quality of service level for a data communication session. In response to a determination that system resources for providing the first quality of service level are unavailable, the system assigns resources for providing a second quality of service level for the data communication session. Thereafter, during the communication session, the system monitors the availability of system resources. If system resources for providing the first quality of service level become available, the system allocates the system resources for use by the user station and upgrades or downgrades the communication session accordingly.

4 Claims, 6 Drawing Sheets

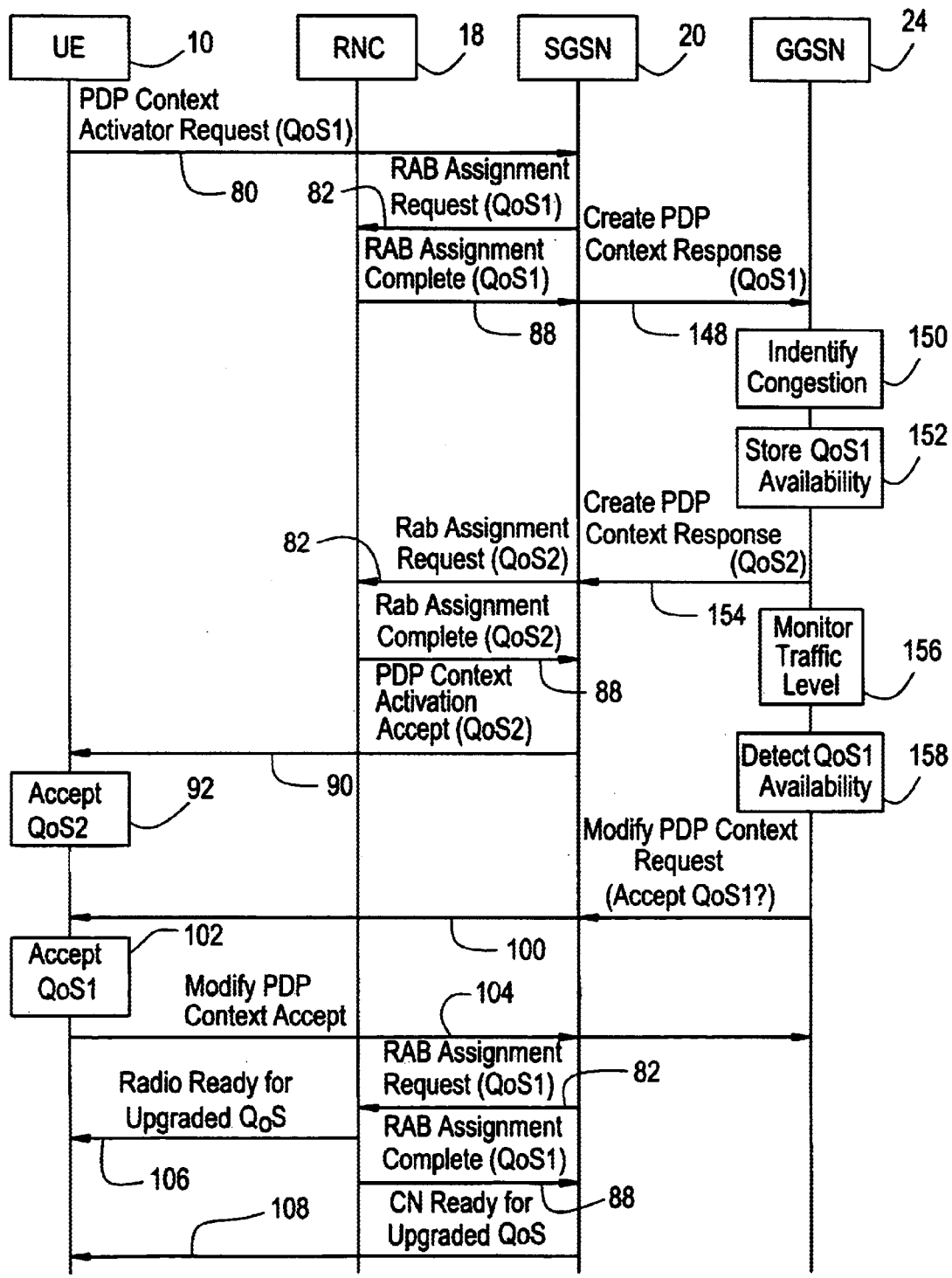

DYNAMIC UPGRADE OF QUALITY OF SERVICE IN A PACKET SWITCHED NETWORK

BACKGROUND OF THE INVENTION

1. Technical Field of the Invention

The present invention relates in general to the transmission of data in a telecommunications network, and in particular to dynamically modifying the quality of service in connection with packet switched communications.

2. Description of Related Art

Initially, mobile telecommunications systems were designed primarily for purposes of enabling voice communications in a wireless environment. As wireless telecommunications systems have evolved, additional voice and messaging services and features have been added. In addition, newer generations of wireless telecommunications systems based on packet switched technology are being designed to handle an even more diverse range of data communications services. In contrast to analog and digital cellular protocols that are designed primarily for voice communications, these services allow for the transmission of large amounts of data at higher speeds than have previously been attainable, the possibility of maintaining a consistent connection to the network, and the ability to handle multimedia applications in an efficient way.

The end to end quality of service for a data. transmission is dependent upon the quality of service characteristics of the networks over which the data travels, such as the amount of bandwidth dedicated to the communication, the transfer delay, the reliability of the transmission (i.e., the error ratio), the traffic handling priority (e.g., a selection of which packets are dropped first if necessary), and the traffic class. In a public land mobile network (PLMN) that provides a packet transport service such as General Packet Radio Service (GPRS), for example, the transmission of data involves resources from both a packet switched core network and a radio network. As a result, the overall quality of service for a data packet transmission depends upon the quality of service provided by each of the packet switched core network and the radio network. The quality of service provided by the radio network is dependent on characteristics of the radio network, while the quality of service provided by the core network is dependent on the characteristics of the core network bearer.

When a data communication is initiated from a subscriber terminal, the subscriber requests a particular quality of service. The PLMN analyzes the request and, based in part on the availability of resources in the network, either provides the requested quality of service, proposes an alternative quality of service, or rejects the request. The subscriber terminal can accept or reject a proposed alternative quality of service or can renegotiate an alternative quality of service if the initial request was rejected.

If the PLMN cannot provide the initially requested quality of service due to congestion in either the radio network or the packet switched core network and the subscriber accepts a lower quality of service, the application that the subscriber wants to run might perform poorly. For example, the lower quality of service might result in slower transmission speeds or in a higher bit error rate. Unless the subscriber subsequently performs a manual upgrade of the quality of service at a time when a higher quality of service is available, any such inferior performance will continue for the duration of the communication session. As a result, the subscriber might run the application for long periods of time (e.g., hours) using a quality of service that is inferior to what he or she is entitled to use and is willing to pay for, even in cases where the PLMN's congested state is alleviated shortly after the subscriber initiated the communication session.

SUMMARY OF THE INVENTION

The present invention comprises a method and system for upgrading and downgrading a quality of service that is provided by a packet-switched telecommunications network for communications involving a mobile user station. When a user station initiates a packet data communication session, the user station requests a certain quality of service. When the telecommunications network receives the request, the network attempts to allocate the requested quality of service for use during the communication session. If the network is congested, however, there might not be sufficient network resources available to be able to provide the requested quality of service. If the network detects such congestion, then an alternative quality of service can be assigned for use by the subscriber station, and the network can initiate a data communication session using that alternative quality of service.

During the communication session, the network monitors the level of congestion. In particular, the network attempts to identify an available quality of service that might be more attractive to the user for use during the ongoing communication session. Once the network identifies such an available quality of service, the network assigns the available quality of service for use by the subscriber station during the communication session. Preferably, the available quality of service is the same as the initially requested quality of service. As a result, the system is able to automatically upgrade or downgrade the quality of service offered to the user in accordance with the initial request.

In accordance with one embodiment of the invention, the network notifies the user station of the assignment of the alternative quality of service and, subsequently, of the availability of the potentially more attractive quality of service. The user is then able to accept or decline any assignment of an alternative quality of service and any modifications of the ongoing quality of service.

In accordance with another embodiment of the invention, the packet-switched telecommunications system comprises a radio network for communicating data packet signals with the user station and a core network for routing the data packets during the communication session. In response to the request for a data communication session, the radio network attempts to assign an appropriate radio access bearer service for use during the communication session, while the core network attempts to assign an appropriate core network bearer service for use during the communication session. If either the radio access bearer service or the core network bearer service cannot provide the requested quality of service, the system subsequently monitors congestion (i.e., after the packet session is established) in the networks to upgrade or downgrade the bearer services as appropriate so as to provide the requested quality of service.

BRIEF DESCRIPTION OF THE DRAWINGS

For a more complete understanding of the present invention, reference is made to the following detailed description taken in conjunction with the accompanying drawings wherein:

FIG. 6 is a message flow and signaling diagram exemplifying another preferred embodiment of the present invention in connection with a UMTS PLMN, wherein a quality of service upgrade is initiated in the gateway GPRS support node (GGSN) of the core network.

DETAILED DESCRIPTION OF THE INVENTION

Figure 1:
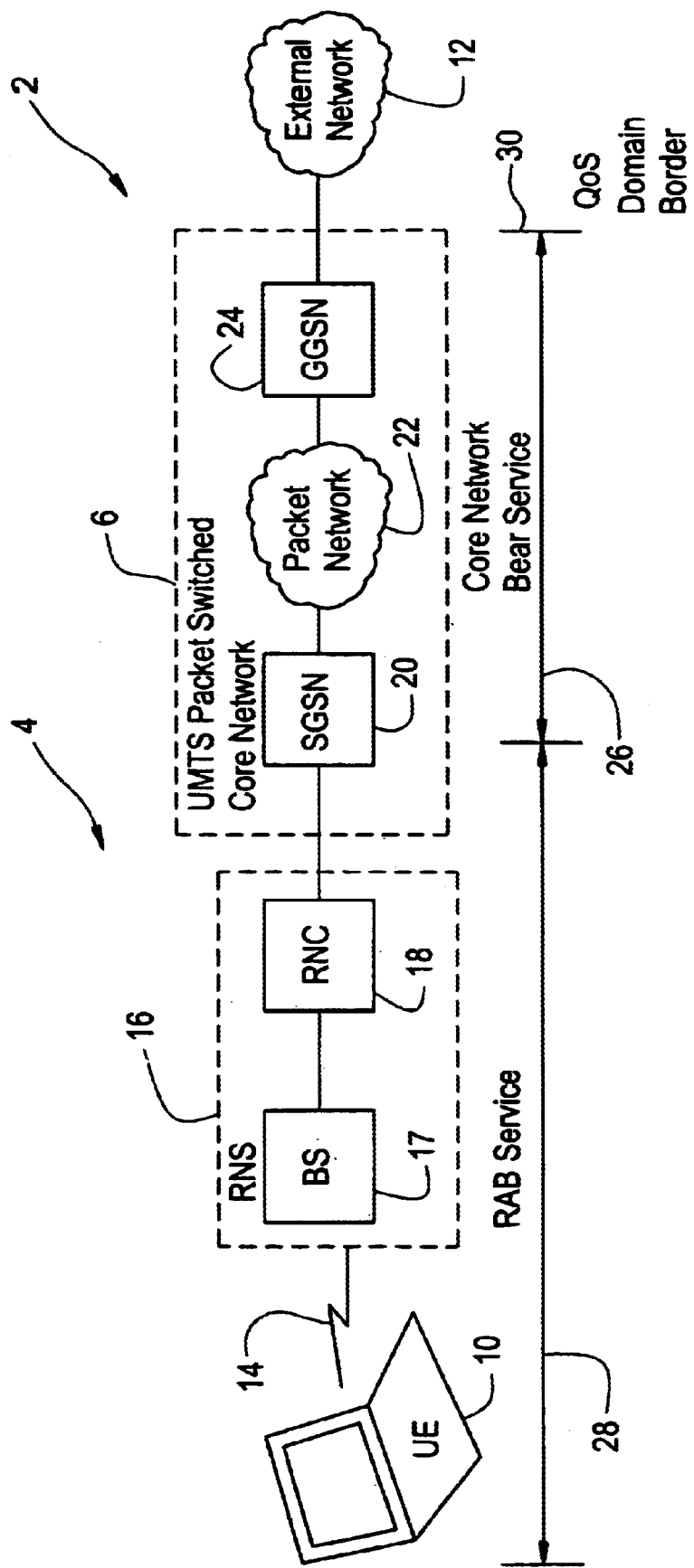
FIG. 1 is a block diagram of a portion of a public land mobile network (PLMN) that is adapted to conduct packet-switched data communications.

Reference is now made to the Drawings wherein like reference characters denote like or similar parts throughout the various Figures. Referring now to FIG. 1, there is illustrated a block diagram of a portion of a public land mobile network (PLMN) 2 that is adapted to conduct packet-switched data communications. The PLMN 2 includes a radio network 4 and a core network 6. Although the PLMN 2 is depicted as operating in accordance with, and will hereinafter be discussed with reference to, third generation standards incorporating the Universal Mobile Telecommunications System (UMTS) standards, those skilled in the art will appreciate that other standards (e.g., GSM/GPRS) and specifications may also utilize the principles of the present invention.

In performing packet-switched data communications in the mobile telecommunications context, data packets are transmitted to a subscriber's user equipment (UE) 10 from a server located in an external network 12 (e.g., the Internet) via the radio network 4 and the core network 6. The user equipment 10 comprises a mobile subscriber station having a mobile termination and a user terminal. An end-to-end transfer of user data (e.g., images, applications software, voice over IP, text, and the like) can take place between the terminal of the user equipment 10 and a data network point-of-presence (i.e., the point to which incoming datagrams are routed from the external networks 12) after a UMTS packet session has been established via control signaling. A request for user data is sent to the UMTS packet-switched core network 6 over the radio network 4, which includes a radio transceiver in the user equipment 10, an air interface 14, and a radio network system (RNS) 16 that includes a base station (BS) 17 and a radio network controller (RNC) 18.

The core network 6, which includes a serving GPRS support node (SGSN) 20, a packet network 22, and a gateway GPRS support node (GGSN) 24, further sends the request to the external network 12 where the server is located. The packet backbone network 22 portion of the core network 6 can, for example, route (e.g., using IP routing) tunneled (e.g., GTP tunneled) user and control plane packets between the network nodes. In such a case, the tunnels might terminate in the SGSN 20 and GGSN 24 via the GTP protocol.

In a preferred embodiment, packet-switched data communications occur during a UMTS packet session, which comprises a logical relationship between a Service Access Point in the mobile terminal of the user equipment 10 and a data network point-of-presence (i.e., the point to which incoming datagrams are routed from an external network 12). Each packet session corresponds to one IP address and to one or more activated PDP contexts, up to a maximum allowed number. Each of the PDP contexts is associated with one UMTS bearer and represents a context in the user equipment 10, the SGSN 20, and the GGSN 24 that contains parameters associated with a flow of packet data, such as a PDP address, PDP type, Access Point Name, and Quality of Service profile. Accordingly, each PDP context is associated with a particular Quality of Service profile. In addition, each PDP context is identified by a mobile terminal identifier (e.g., an International Mobile Station Identifier (IMSI)) and a PDP context index (e.g., NSAPI) for the mobile terminal. During a PDP context activation from the user equipment 10 that is initiating or involved in a packet session, different Quality of Service profiles can be achieved through the PLMN 2 by requesting a specific Quality of Service in a "QoS" parameter of a PDP Context Activation Request, which is initiated by a mobile terminal part of the user equipment 10. The requested Quality of Service is used to define the Quality of Service characteristics of the UMTS bearer set up for the PDP context. The UMTS bearer includes a Radio Access Bearer (RAB), which consists of the radio bearer and the GTP tunnel between the RNC 18 and the SGSN 20, and core network bearer, which consists of the GTP tunnel between the SGSN 20 and the GGSN 24.

During a packet session, the user equipment 10 maps uplink IP user packets to a particular UMTS bearer, which includes a particular core network bearer service 26 and a particular radio access bearer service 28. Similarly, for downlink IP user packets, the GGSN 24 maps the packets to a specific UMTS bearer. In particular, the Quality of Service indication that is specified in the user packet (e.g., a data service (DS) byte) is mapped to a UMTS bearer with a defined Quality of Service in the user equipment 10 for uplink traffic and in the GGSN 24 for downlink traffic. Accordingly, the UMTS bearer is established via control signals at the UMTS packet session activation (e.g., PDP context activation).

The core network bearer service 26 and the radio access bearer service 28 collectively provide a tunnel for the transfer of user data packets between the user equipment 10 and the GGSN 24, which serves as the external network border. The control signaling that occurs during the packet session activation sets up these bearers 26 and 28 with the appropriate Quality of Service profiles. The quality of service for the data transmission through the PLMN 2 is dependent upon the individual quality of service provided by each of the core network bearer service 26 and the radio access bearer (RAB) service 28. Thus, if either of the individual networks 4 and 6 cannot provide the requested quality of service, then the user equipment 10 cannot obtain the requested quality of service. In addition, the actual quality of service might further depend upon factors that are beyond a quality of service (QoS) domain border 30 for the PLMN 2. Such external factors, however, cannot be controlled by the PLMN 2. Instead, the quality of service offered by the radio network 4 and the core network 6 are entirely independent of any factors affecting transmission quality that are outside of the PLMN 2.

Once the RAB service 28 and the core network bearer service 26 have been set up and assuming the requested quality of service is available, the server in the external network 12 responds to a request for certain data by transmitting the data to the GGSN 24. The GGSN 24, in turn, transmits the data to the user equipment 10 via the core network 6 and the radio network 4.

On the other hand, if the requested quality of service is not available (e.g., because of congestion in the network), the PLMN 2 can either deny the data request or can propose an alternative quality of service by mapping the user equipment 10 to a different bearer service 26 or 28. If the user accepts a lower quality of service, or initiates a data request with a lower quality of service, it might be desirable to allow the user to upgrade the quality of service if a higher quality of service subsequently becomes available. Similarly, if the PLMN 2 proposes, and the user accepts, a higher quality of service than was requested (assuming the user equipment 10 is capable of supporting the higher quality of service), or the user initiates a higher quality of service due to an unavailability of the requested quality of service, the user might have to pay more for the service than he or she would prefer to pay. The user, therefore, might want to downgrade the quality of service if the lower, initially requested quality of service subsequently becomes available. Current systems, however, do not provide for such a quality of service upgrade or downgrade.

In accordance with the present invention, the PLMN 2 stores the initial quality of service request received from the user equipment 10 in either the radio network 4 or the core network 6. Then, if the initially requested quality of service becomes available, the network 2 will initiate an automatic upgrade or downgrade of the quality of service, conditioned upon acceptance by the user, by altering the UMTS bearer Quality of Service characteristics that were initially negotiated between the user equipment 10 and the PLMN 2 during the packet session activation. In particular, the network will reserve the resources that are necessary for providing the initially requested quality of service and will query the user to determine whether the user wants to upgrade or downgrade to that quality of service. If the user accepts, the network 2 initiates the automatic upgrade or downgrade of the quality of service.

Figure 2:
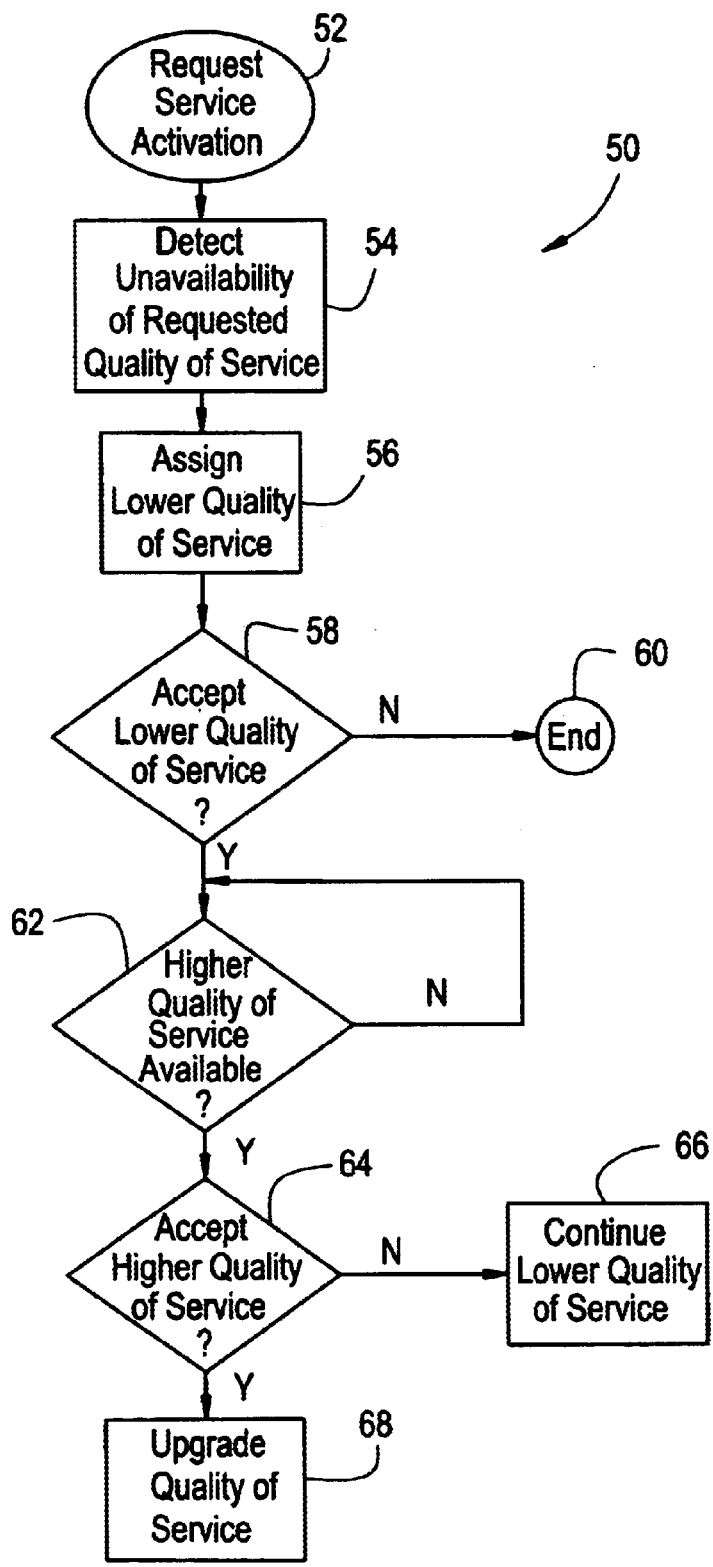
FIG. 2 is a flow diagram of a method for performing a dynamic upgrade of a quality of service in a mobile telecommunications system.

Referring now to FIG. 2, there is illustrated a flow diagram of a method 50 for performing a dynamic upgrade of a quality of service in a mobile telecommunications system. Initially, the user equipment 10 requests activation of a service, including a designation of a desired quality of service, at step 52. The system, however, detects an unavailability of the requested quality of service at step 54. As a result, the system identifies a lower level quality of service that is available and assigns the user equipment communications to that lower quality of service at step 56. The user equipment 10 is then queried at step 58 to determine if the user is willing to accept the lower quality of service. If the user rejects the lower quality of service, then the process 50 ends at step 60. On the other hand, if the user accepts the lower quality of service, the system activates the requested service.

Thereafter, the system continuously monitors the quality of service availability within the PLMN 2 at step 62. Once the system determines that a higher quality of service is available, the user is again queried at step 64 to determine if the user is willing to accept the particular higher quality of service. Such a higher quality of service would generally involve a higher charging rate. If the user is unwilling to accept the higher charges, or is otherwise unwilling to accept an upgraded quality of service, the system continues to operate at the lower quality of service at step 66. If the user does accept the higher quality of service (and the higher charging rate, if applicable), the system upgrades the quality of service at step 68.

Figure 3:
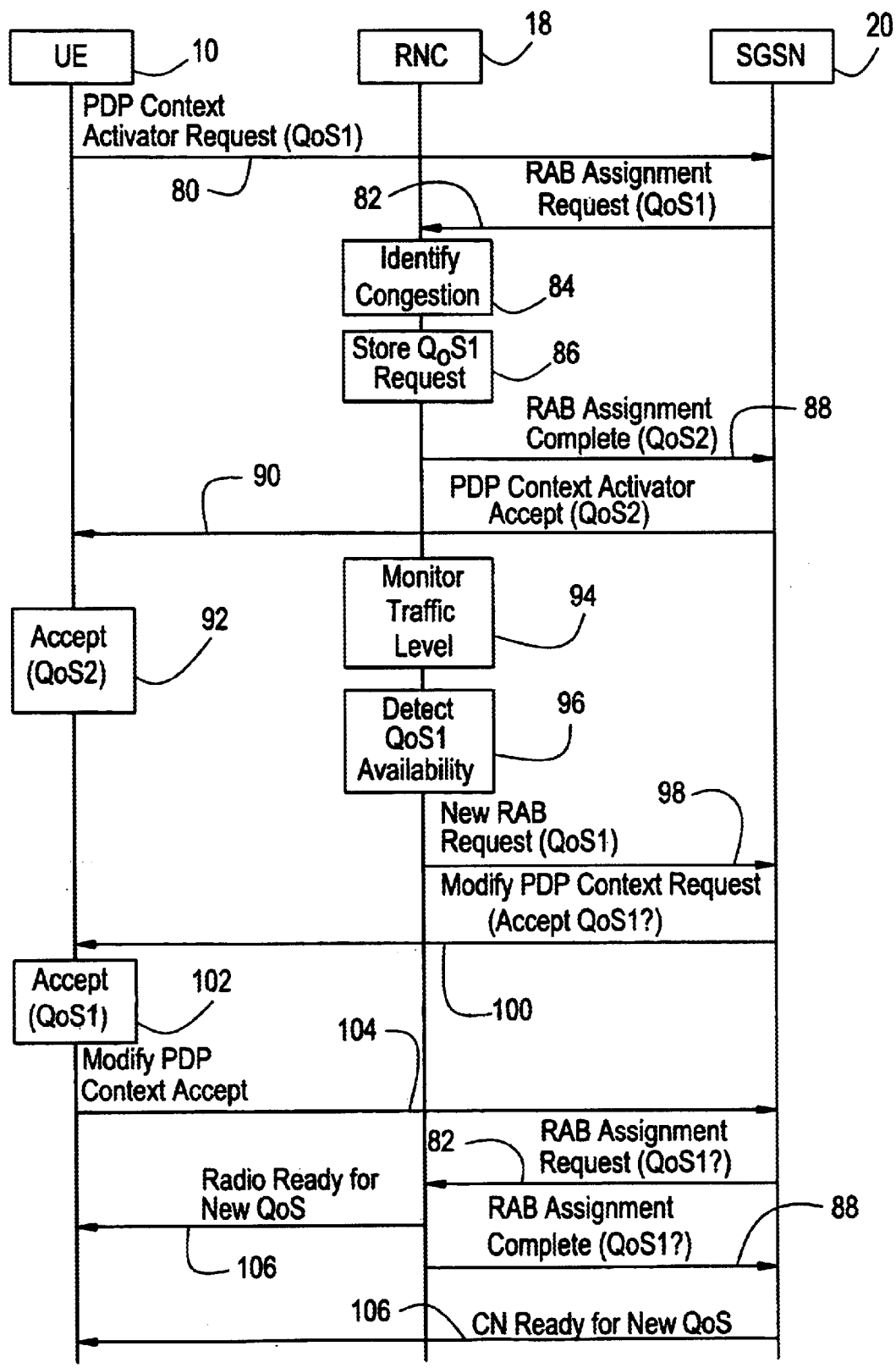
FIG. 3 is a message flow and signaling diagram exemplifying one preferred embodiment of the present invention in connection with a UMTS PLMN, wherein a quality of service upgrade is initiated in the radio network.

Referring now to FIG. 3, there is depicted a message flow and signaling diagram exemplifying one preferred embodiment of the present invention in connection with a UMTS PLMN 2, wherein a quality of service update is initiated in the radio network 4. The user equipment 10 sends a packet data protocol (PDP) context activation request 80 requesting a first quality of service (QoS1) level via the radio network controller (RNC) 18 to the SGSN 20. The PDP context activation request 80 is used to initiate a data communication session. In response, the SGSN 20 sends a radio access bearer (RAB) assignment request 82 to the RNC 18 requesting an assignment of resources to provide the user equipment 10 with the first quality of service (QoS1) level. At step 84, however, the RNC 18 identifies congestion in the radio network 4 that prevents the radio network 4 from being able to provide the requested first quality of service (QoS1). Because of the congestion, the RNC 18 assigns a second quality of service (QoS2) level for use by the user equipment 10 and, at step 86, stores an indication that the first quality of service (QoS1) level was requested.

The RNC 18 sends the SGSN 20 an RAB assignment complete message 88 indicating the assignment of a radio access bearer having the second quality of service (QoS2) for use by the user equipment 10. The SGSN 20 then sends a PDP context activation accept message 90 to the user equipment 10 indicating that the second quality of service (QoS2) level has been assigned to the user equipment 10. Because the second quality of service is different from what was originally requested, the user equipment 10 can either accept or reject the alternative quality of service assignment. In this example, it is assumed that user equipment accepts the second quality of service (QoS2) at step 92. As a result, the data communication session is successfully implemented, albeit at a different quality of service level than was originally requested.

During the data communication session, the RNC 18 monitors the traffic level at step 94 as a result of having previously stored the initial quality of service request at step 86. Eventually, at step 96, the RNC 18 identifies a radio access bearer service that is capable of providing the first quality of service (QoS1). Accordingly, the RNC 18 sends a new RAB request 98 to the SGSN 20 indicating that the first quality of service (QoS1) can now be provided. The SGSN 20, in turn, sends a message (e.g., a Create PDP Context Request message(See FIG. 6)) to the GGSN 24 to determine whether the GGSN 24 can also provide the first quality of service. Assuming the GGSN 24 can support the first quality of service, the necessary resources are reserved in the GGSN 24 and the SGSN 20 sends a modify PDP context request 100 to query the user equipment 10 as to whether the user is willing to accept the initially requested quality of service (QoS1). Assuming the user equipment 10 accepts the first quality of service (QoS1) at step 102, the user equipment 10 transmits a modify PDP context accept message 104 to the SGSN 20.

In response, the SGSN 20 sends a message (not shown) to the GGSN 24 (see FIG. 1) instructing the GGSN 24 to provide the first quality of service and sends a radio access bearer (RAB) assignment request 82 to the RNC 18 again requesting an assignment of resources to provide the user equipment 10 with the first quality of service (QoS1) level. In this case, the RNC 18 can provide a radio access bearer service having the first quality of service (QoS1) level, as indicated in the new RAB request 98. Thus, the RNC 18 allocates the appropriate radio access bearer service for use by the user equipment 10 and sends a message 106 notifying the user equipment 10 that the radio network 4 is ready for the new quality of service. The RNC 18 also sends the SGSN 20 another RAB assignment complete message 88 indicating the assignment of a radio access bearer having the first quality of service (QoS1) for use by the user equipment 10. The SGSN 20 then sends a message 108 notifying the user equipment 10 that the core network (CN) 4 is ready for the new quality of service. The data communications can then continue but at the new quality of service level.

Alternatively, instead of updating the quality of service to the originally requested quality of service, the system might also select some other quality of service level that might be more desirable to the user. For example, if the user initially requests a first quality of service but is assigned a much lower second quality of service due to congestion in the network, the system can upgrade to a third quality of service that is intermediate to the first and second quality of service levels, assuming that the user accepts the third quality of service.

Figure 4:
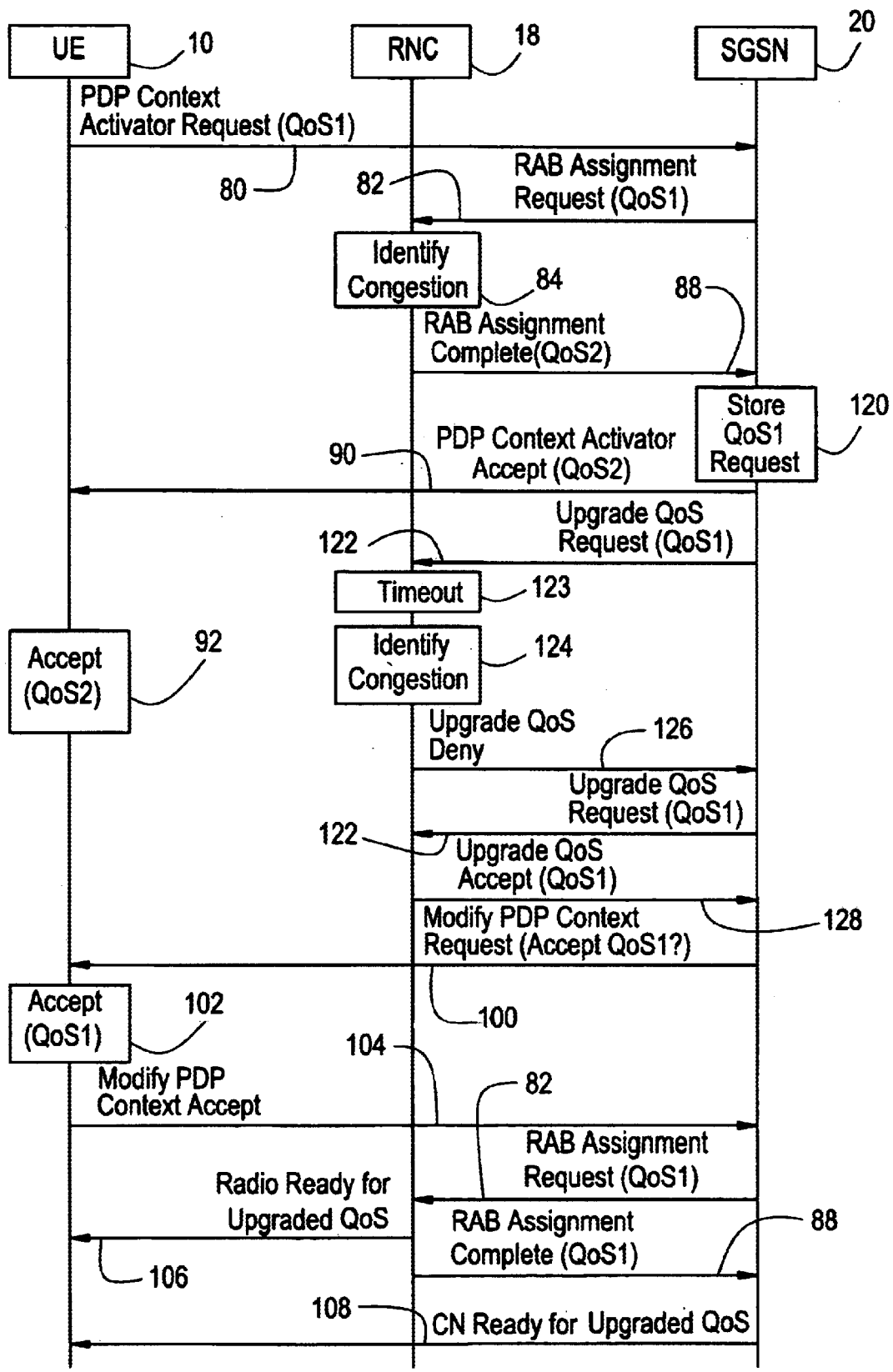
FIG. 4 is a message flow and signaling diagram exemplifying another preferred embodiment of the present invention in connection with a UMTS PLMN, wherein a quality of service upgrade is initiated in the serving switching node of the core network.

Referring now to FIG. 4, there is depicted a message flow and signaling diagram exemplifying another preferred embodiment of the present invention in connection with a UMTS PLMN 2, wherein a quality of service upgrade is initiated in the core network 6. First, the user equipment 10 sends a packet data protocol (PDP) context activation request 80 requesting a first quality of service (QoS1) level via the RNC 18 to the SGSN 20. In response, the SGSN 20 sends a radio access bearer (RAB) assignment request 82 to the RNC 18 requesting an assignment of resources to provide the user equipment 10 with the first quality of service (QoS1) level. At step 84, however, the RNC 18 identifies congestion in the radio network 4 that prevents the radio network 4 from being able to provide the requested quality of service. Because of the congestion, the RNC 18 assigns a second quality of service (QoS2) level for use by the user equipment 10 and sends the SGSN 20 an RAB assignment complete message 88 indicating the assignment of a radio access bearer having the second quality of service (QoS2) for use by the user equipment 10.

The SGSN 20 recognizes, however, that the assigned quality of service is not what was originally requested and, at step 120, stores an indication that the first quality of service (QoS1) level was initially requested. The SGSN 20 then sends a PDP context activation accept message 90 to the user equipment 10 indicating that the second quality of service (QoS2) level has been assigned to the user equipment 10. Because the second quality of service is different from what was originally requested, the user equipment 10 can either accept or reject the alternative quality of service assignment. In this example, it is assumed that the user equipment 10 accepts the second quality of service (QoS2) at step 92. As a result, the data communication session is successfully implemented, albeit at a different quality of service level than was originally requested.

During the data communication session, the SGSN 20 periodically transmits an upgrade quality of service (QoS) request 122 to the RNC 18 as a result of having previously stored the initial quality of service request at step 120. In response to the request 122, the RNC 18 determines whether a higher quality radio access bearer is available during a timeout interval 123 in which resources in the RNC 18 are polled to determine the availability of radio access bearers at the RNC 18. If the RNC 18 determines at step 124 that the radio network 4 is still congested, the RNC 18 sends a message 126 denying the upgrade QoS request 122. The SGSN 20 will then continue to periodically send an upgrade quality of service request 122. If the RNC 18 determines that a higher quality radio access bearer is available, the RNC 18 sends an upgrade quality of service acceptance message 128.

The SGSN 20, in turn, sends a message (see FIG. 6) to the GGSN 24 to determine whether the GGSN 24 can support the first quality of service and to reserve the necessary resources. The SGSN 20 also sends a modify PDP context request 100 to query the user equipment 10 as to whether the user is willing to accept the initially requested quality of service (QoS1). Assuming the user equipment 10 accepts the first quality of service (QoS1) at step 102, the user equipment 10 transmits a modify PDP context accept message 104 to the SGSN 20. In response, the SGSN 20 notifies the GGSN 24 of the upgrade and sends a radio access bearer (RAB) assignment request 82 to the RNC 18 again requesting an assignment of resources to provide the user equipment 10 with the first quality of service (QoS1) level. In this case, the RNC 18 can provide a radio access bearer service having the first quality of service level, as indicated in the upgrade quality of service acceptance message 128. Thus, the RNC 18 allocates the appropriate radio access bearer service for use by the user equipment 10 and sends a message 106 notifying the user equipment 10 that the radio network 4 is ready for the new quality of service.

The RNC 18 also sends the SGSN 20 another RAB assignment complete message 88 indicating the assignment of a radio access bearer having the first quality of service (QoS1) for use by the user equipment 10. The SGSN 20 then sends a message 108 notifying the user equipment 10 that the core network (CN) 4 is ready for the new quality of service. Although FIG. 4 illustrates a situation in which the SGSN 20 periodically queries the radio network 4 for purposes of upgrading to an originally requested, higher quality of service, if it is available, it will be understood by those of ordinary skill in the art that the same process can also be used, under appropriate circumstances, for purposes of downgrading the quality of service or changing the quality of service to a level other than what was originally requested.

Figure 5:
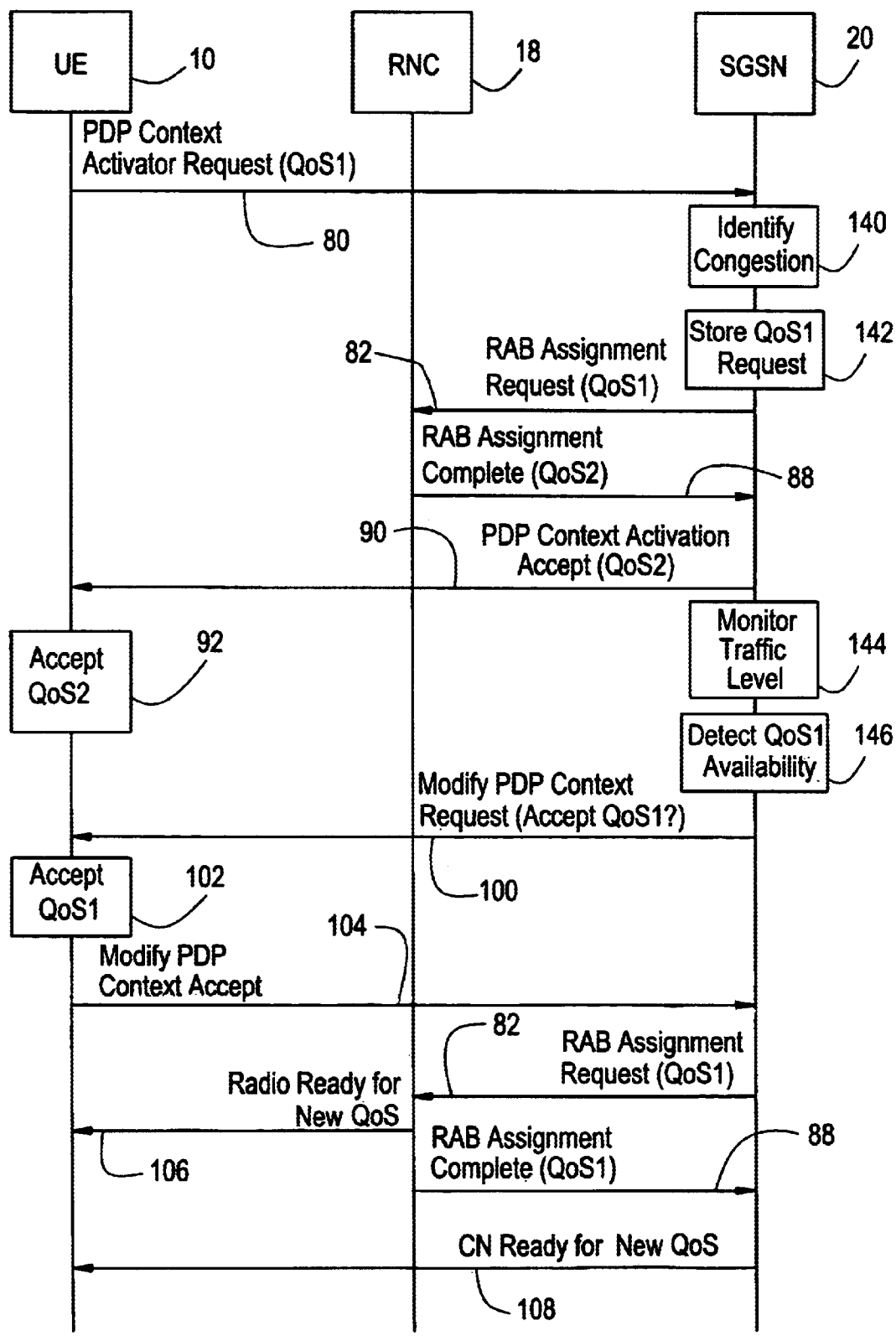
FIG. 5 is a message flow and signaling diagram exemplifying yet another preferred embodiment of the present invention in connection with a UMTS PLMN, wherein a quality of service upgrade is initiated in the service switching node of the core network.

Referring now to FIG. 5, there is depicted a message flow and signaling diagram exemplifying yet another preferred embodiment of the present invention in connection with a UMTS PLMN 2, wherein a quality of service upgrade is initiated in the core network 6. As with the previous embodiments, the user equipment 10 sends a packet data protocol (PDP) context activation request 80 requesting a first quality of service (QoS1) level via the RNC 18 to the SGSN 20. In this case, however, at step 140, the SGSN 20 identifies congestion in the SGSN 20 itself (or in some other part of the core network 6) that prevents the core network 6 from being able to provide the requested quality of service. Because of the congestion, the SGSN 20 assigns a second quality of service (QoS2) level for use by the user equipment 10 and, at step 142, stores an indication that the first quality of service (QoS1) level was initially requested.

The SGSN 20 sends a radio access bearer (RAB) assignment request 82 to the RNC 18 again requesting an assignment of resources to provide the user equipment 10 with the second quality of service (QoS2) level. Assuming the RNC 18 can provide a radio access bearer service having the second quality of service level, the RNC 18 allocates the appropriate radio access bearer service for use by the user equipment 10 and sends a message 106 notifying the user equipment 10 that the radio network 4 is ready for the new quality of service. The RNC 18 also sends the SGSN 20 another RAB assignment complete message 88 indicating the assignment of a radio access bearer having the second quality of service (QoS2) for use by the user equipment 10.

The SGSN 20 then sends a PDP context activation accept message 90 to the user equipment 10 indicating that the second quality of service (QoS2) level has been assigned to the user equipment 10. Because the second quality of service is different from what was originally requested, the user equipment 10 can either accept or reject the alternative quality of service assignment. In this example, it is assumed that user equipment accepts the second quality of service (QoS2) at step 92. As a result, the data communication session is successfully implemented, albeit at a different quality of service level than was originally requested.

During the data communication session, the SGSN 20 monitors the traffic level at step 144 as a result of having previously stored the initial quality of service request at step 142. Eventually, at step 146, the SGSN 20 identifies a core network bearer service that is capable of providing the first quality of service (QoS1). The SGSN 20 allocates that core network bearer service to the user equipment and notifies the GGSN 24 of the change to the first quality of service to determine whether the GGSN 24 can support the change and so that the GGSN 24 can reserve the necessary resources. The SGSN 20 then sends a modify PDP context request 100 to query the user equipment 10 as to whether the user is willing to accept the first quality of service (QoS1). If the user equipment 10 accepts the first quality of service (QoS1) at step 102, the user equipment 10 transmits a modify PDP context accept message 104 to the SGSN 20.

In response, the SGSN 20 sends a radio access bearer (RAB) assignment request 82 to the RNC 18 again requesting an assignment of resources to provide the user equipment 10 with the first quality of service (QoS1) level. Assuming the RNC 18 can provide a radio access bearer service having the first quality of service level, the RNC 18 allocates the appropriate radio access bearer service for use by the user equipment 10 and sends a message 106 notifying the user equipment 10 that the radio network 4 is ready for the new quality of service. The RNC 18 also sends the SGSN 20 another RAB assignment complete message 88 indicating the assignment of a radio access bearer having the first quality of service (QoS1) for use by the user equipment 10. The SGSN 20 then instructs the GGSN 24 to activate the first quality of service and transmits a message 108 notifying the user equipment 10 that the core network (CN) 4 is ready for the new quality of service.

Referring now to FIG. 6, there is depicted a message flow and signaling diagram exemplifying another preferred embodiment of the present invention in connection with a UMTS PLMN 2, wherein a quality of service upgrade is initiated in the GGSN 24 of the core network 6. As with the previous embodiments, the user equipment 10 sends a packet data protocol (PDP) context activation request 80 requesting a first quality of service (QoS1) level via the RNC 18 to the SGSN 20. The SGSN 20 then sends a radio access bearer (RAB) assignment request 82 to the RNC 18 requesting an assignment of resources to provide the user equipment 10 with the first quality of service (QoS1) level. In response, the RNC 18 assigns a first quality of service (QoS1) level for use by the user equipment 10 and sends the SGSN 20 an RAB assignment complete message 88 indicating the assignment of a radio access bearer having the first quality of service (QoS1) for use by the user equipment 10.

Next, a create PDP context request message 148 is forwarded to the GGSN 24 to request an allocation of resources for providing the first quality of service. At step 150, the GGSN 24 identifies congestion in the GGSN 24 itself (or in some other part of the core network 6) that prevents the core network 6 from being able to provide the requested quality of service. Because of the congestion, the GGSN 24 assigns a second quality of service (QoS2) level for use by the user equipment 10 and, at step 152, stores an indication that the first quality of service (QoS1) level was initially requested.

The GGSN 24 notifies the SGSN 20 that the user equipment 10 has been assigned a core network bearer service providing the second quality of service (QoS2) level in a create PDP context response message 154. The SGSN 20 then sends another radio access bearer (RAB) assignment request 82 to the RNC 18 requesting an assignment of resources to provide the user equipment 10 with the second quality of service (QoS2) level. In response, the RNC 18 assigns a second quality of service (QoS2) level for use by the user equipment 10 and sends the SGSN 20 an RAB assignment complete message 88 indicating the assignment of a radio access bearer having the second quality of service (QoS2) for use by the user equipment 10.

The SGSN 20 then sends a PDP context activation accept message 90 to the user equipment 10 indicating that the second quality of service (QoS2) level has been assigned to the user equipment 10. Because the second quality of service is different from what was originally requested, the user equipment 10 can either accept or reject the alternative quality of service assignment. It is again assumed that user equipment accepts the second quality of service (QoS2) at step 92. As a result, the data communication session is successfully implemented, albeit at a different quality of service level than was originally requested.

During the data communication session, the GGSN 24 monitors the traffic level at step 156 as a result of having previously stored the initial quality of service request at step 152. Eventually, at step 158, the GGSN 24 identifies a core network bearer service that is capable of providing the first quality of service (QoS1). The GGSN 24 allocates that core network bearer service to the user equipment and sends a modify PDP context request 100 to the SGSN 20, which forwards the request 100 to the user equipment 10 to query the user equipment 10 as to whether the user is willing to accept the first quality of service (QoS1). If the user equipment 10 accepts the first quality of service (QoS1) at step 102, the user equipment 10 transmits a modify PDP context accept message 104 to the SGSN 20 and the GGSN 24.

In response, the SGSN 20 sends a radio access bearer (RAB) assignment request 82 to the RNC 18 again requesting an assignment of resources to provide the user equipment 10 with the first quality of service (QoS1) level. Assuming the RNC 18 can provide a radio access bearer service having the first quality of service level, the RNC 18 allocates the appropriate radio access bearer service for use by the user equipment 10 and sends a message 106 notifying the user equipment 10 that the radio network 4 is ready for the new quality of service. The RNC 18 also sends the SGSN 20 another RAB assignment complete message 88 indicating the assignment of a radio access bearer having the first quality of service (QoS1) for use by the user equipment 10. The SGSN 20 then transmits a message 108 notifying the user equipment 10 that the core network (CN) 4 is ready for the new quality of service.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A packet-switched telecommunications system, comprising:
- a radio network for communicating signals containing data packets with a mobile user station;
- a core network for routing the data packets and for receiving a request from the user station to route the data packets at a first quality of service level; and
- wherein the telecommunications system is operable to allocate system resources comprising a second radio bearer service for providing a second quality of service level over the radio network and the core network for the date packet routing when system resources comprising a first radio bearer service for providing the first quality of service level are unavailable, the telecommunications system further operating to allocate the system resources for providing the first quality of service level over the radio network and the core network for the data packet routing if the telecommunication system identifies available system resources for providing the first quality of service level during the communication of the data packet signals.

2. A packet-switched telecommunications system, comprising:
- a radio network for communicating signals containing data packets with a mobile user station;
- a core network for routing the data packets and for receiving a request from the user station to route the data packets at a first quality of service level; and
- wherein the radio network is operable to allocate system resources for providing a second quality of service level over the radio network and the core network for the data packet routing when system resources for providing the first quality of service level are unavailable, the radio network further operating to allocate system resources for providing the first quality of service level over the radio network and the core network for the data packet routing if the telecommunication system identifies available system resources for providing the first quality of service level during the communication of the data packet signals.

3. A packet-switched telecommunications system, comprising:
- a radio network for communicating signals containing data packets with a mobile user station;
- a core network for routing the data packets and for receiving a request from the user station to route the data packets at a first quality of service level, wherein the core network monitors system congestion to Identify whether system resources for providing the first quality of service level are available by periodically querying the radio network; and
- wherein the telecommunications system is operable to allocate system resources for providing a second quality of service level over the radio network and the core network for the data packet routing when system resources for providing the first quality of service level are unavailable, the telecommunications system further operating to allocate system resources for providing first quality of service level over the radio network and the core network for the data packet routing if the telecommunication system identifies available system resources for providing the first quality of service level during the communication of the data packet signals.

4. A packet-switched telecommunications system, comprising:
- a radio network for communicating signals containing data packets with a mobile user station, wherein the radio network monitors system congestion to identify whether system resources for providing a first quality of service level are available;
- a core network for routing the data packets and for receiving a request from the user station to route the data packets at the first quality of service level; and
- wherein the telecommunications system is operable to allocate system resources for providing a second quality of service level over the radio network and the core network for the data packet routing when system resources for providing the first quality of service level are unavailable, the telecommunications system further operating to allocate system resources for providing the first quality of service level over the radio network and the core network for the data packet routing if the telecommunication system identifies available system resources for providing the first quality of service level during the communication of the data packet signals.

* * * * *